US009589570B2

(12) United States Patent
Gao

(10) Patent No.: US 9,589,570 B2
(45) Date of Patent: Mar. 7, 2017

(54) AUDIO CLASSIFICATION BASED ON PERCEPTUAL QUALITY FOR LOW OR MEDIUM BIT RATES

(71) Applicant: Huawei Technologies Co., LTD, Shenzhen (CN)

(72) Inventor: Yang Gao, Mission Viejo, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 419 days.

(21) Appl. No.: 14/027,052

(22) Filed: Sep. 13, 2013

(65) Prior Publication Data

US 2014/0081629 A1 Mar. 20, 2014

Related U.S. Application Data

(60) Provisional application No. 61/702,342, filed on Sep. 18, 2012.

(51) Int. Cl.
*G10L 19/20* (2013.01)
*G10L 25/93* (2013.01)
(Continued)

(52) U.S. Cl.
CPC ............ *G10L 19/002* (2013.01); *G10L 19/20* (2013.01); *G10L 25/90* (2013.01); *G10L 25/93* (2013.01)

(58) Field of Classification Search
CPC ....... G10L 19/002; G10L 19/20; G10L 25/93; G10L 25/90
(Continued)

(56) References Cited

U.S. PATENT DOCUMENTS 6,298,322 B1 * 10/2001 Lindemann ............. G10L 19/02 704/200.1
6,456,965 B1 * 9/2002 Yeldener ................. G10L 25/90 704/207

(Continued)

FOREIGN PATENT DOCUMENTS

CN 101256772 A 9/2008
JP 2014500521 A 1/2014

(Continued)

OTHER PUBLICATIONS

International Search Report received in Application No. PCT/CN2013/083794, mailed Dec. 26, 2013, 11 pages.

(Continued)

*Primary Examiner* — Fariba Sirjani
(74) *Attorney, Agent, or Firm* — Slater Matsil, LLP

(57) ABSTRACT

The quality of encoded signals can be improved by reclassifying AUDIO signals carrying non-speech data as VOICE signals when periodicity parameters of the signal satisfy one or more criteria. In some embodiments, only low or medium bit rate signals are considered for re-classification. The periodicity parameters can include any characteristic or set of characteristics indicative of periodicity. For example, the periodicity parameter may include pitch differences between subframes in the audio signal, a normalized pitch correlation for one or more subframes, an average normalized pitch correlation for the audio signal, or combinations thereof. Audio signals which are re-classified as VOICED signals may be encoded in the time-domain, while audio signals that remain classified as AUDIO signals may be encoded in the frequency-domain.

14 Claims, 7 Drawing Sheets

(51) Int. Cl.
*G10L 25/90* (2013.01)
*G10L 19/002* (2013.01)

(58) Field of Classification Search
USPC .......................................................... 704/208
See application file for complete search history.

(56) References Cited

U.S. PATENT DOCUMENTS

| | | | | |
|---|---|---|---|---|
| 6,496,797 | B1 * | 12/2002 | Redkov | G10L 19/08 704/220 |
| 6,549,885 | B2 * | 4/2003 | Ehara | G10L 19/12 704/220 |
| 8,224,657 | B2 * | 7/2012 | Jelinek | G10L 19/24 704/500 |
| 8,447,620 | B2 * | 5/2013 | Neuendorf | G10L 19/008 704/200 |
| 9,037,456 | B2 * | 5/2015 | Mittal | G10L 19/20 704/219 |
| 9,037,457 | B2 * | 5/2015 | Geiger | G10L 19/012 704/200.1 |
| 9,037,474 | B2 * | 5/2015 | Gao | G10L 19/022 704/500 |
| 9,099,099 | B2 * | 8/2015 | Gao | |
| 2001/0023396 | A1 * | 9/2001 | Gersho | G10L 19/10 704/220 |
| 2002/0111797 | A1 * | 8/2002 | Gao | G10L 19/02 704/207 |
| 2002/0177994 | A1 * | 11/2002 | Chang | G10L 25/90 704/205 |
| 2003/0009325 | A1 * | 1/2003 | Kirchherr | G10L 19/20 704/211 |
| 2003/0088401 | A1 * | 5/2003 | Terez | G10L 25/90 704/207 |
| 2003/0125935 | A1 * | 7/2003 | Zinser, Jr. | G10L 19/00 704/207 |
| 2004/0260545 | A1 * | 12/2004 | Gao | G10L 19/18 704/222 |
| 2004/0267525 | A1 * | 12/2004 | Lee | G10L 19/20 704/208 |
| 2005/0114124 | A1 * | 5/2005 | Liu | G10L 21/0208 704/228 |
| 2005/0154584 | A1 * | 7/2005 | Jelinek | G10L 19/005 704/219 |
| 2007/0143107 | A1 * | 6/2007 | Ben-David | G10L 15/30 704/234 |
| 2008/0147414 | A1 * | 6/2008 | Son | G10L 19/20 704/500 |
| 2008/0249784 | A1 * | 10/2008 | Stachurski | G10L 19/12 704/500 |
| 2009/0037168 | A1 * | 2/2009 | gao | G10L 19/005 704/219 |
| 2009/0119097 | A1 * | 5/2009 | Master | G10H 1/0008 704/207 |
| 2010/0268530 | A1 * | 10/2010 | Sun | G10L 25/90 704/207 |
| 2011/0218800 | A1 * | 9/2011 | Zhang | G10L 19/08 704/207 |
| 2012/0101813 | A1 * | 4/2012 | Vaillancourt | G10L 19/20 704/206 |
| 2013/0185063 | A1 * | 7/2013 | Atti | G10L 17/02 704/219 |
| 2013/0246068 | A1 * | 9/2013 | Lee | G10L 19/09 704/265 |
| 2014/0081629 | A1 * | 3/2014 | Gao | G10L 19/20 704/208 |
| 2014/0330415 | A1 * | 11/2014 | Ramo | G10L 19/06 700/94 |
| 2016/0027450 | A1 * | 1/2016 | Gao | G10L 19/125 704/205 |

FOREIGN PATENT DOCUMENTS

| | | | |
|---|---|---|---|
| KR | 1020080055026 | A | 6/2008 |
| WO | 02065457 | A2 | 8/2002 |
| WO | 2008072913 | A1 | 6/2008 |
| WO | 2010003521 | A1 | 1/2010 |
| WO | 2012055016 | A1 | 5/2012 |

OTHER PUBLICATIONS

"Series G: Transmission Systems and Media, Digital Systems and Networks Digital terminal equipments—Coding of voice and audio signals; Frame error robust narrow-band and wideband embedded variable bit-rate coding of speech and audio from 8-32 kbits/s." ITU-T Standard G.718, Jun. 2008, 257 pages.

* cited by examiner

AUDIO CLASSIFICATION BASED ON PERCEPTUAL QUALITY FOR LOW OR MEDIUM BIT RATES

This application claims the benefit of U.S. Provisional Application No. 61/702,342 filed on Sep. 18, 2012, entitled "Improving AUDIO/VOICED Classification Based on Perceptual Quality for Low or Medium Bit Rates," which is incorporated herein by reference as if reproduced in its entirety.

TECHNICAL FIELD

The present invention relates generally to audio classification based on perceptual quality for low or medium bit rates.

BACKGROUND

Audio signals are typically encoded prior to being stored or transmitted in order to achieve audio data compression, which reduces the transmission bandwidth and/or storage requirements of audio data. Audio compression algorithms reduce information redundancy through coding, pattern recognition, linear prediction, and other techniques. Audio compression algorithms can be either lossy or lossless in nature, with lossy compression algorithms achieving greater data compression than lossless compression algorithms.

SUMMARY OF THE INVENTION

Technical advantages are generally achieved, by embodiments of this disclosure which describe methods and techniques for improving AUDIO/VOICED classification based on perceptual quality for low or medium bit rates.

In accordance with an embodiment, a method for classifying signals prior to encoding is provided. In this example, the method includes receiving a digital signal comprising audio data. The digital signal is initially classified as an AUDIO signal. The method further includes re-classifying the digital signal as a VOICED signal when one or more periodicity parameters of the digital signal satisfy a criteria, and encoding the digital signal in accordance with a classification of the digital signal. The digital signal is encoded in the frequency-domain when the digital signal is classified as an AUDIO signal. The digital signal is encoded in the time-domain when the digital signal is re-classified as a VOICED signal. An apparatus for performing this method is also provided.

In accordance with another embodiment, another method for classifying signals prior to encoding is provided. In this example, the method includes receiving a digital signal comprising audio data. The digital signal is initially classified as an AUDIO signal. The method further includes determining normalized pitch correlation values for subframes in the digital signal, determining an average normalized pitch correlation value by averaging the normalized pitch correlation values, and determining pitch differences between subframes in the digital signal by comparing the normalized pitch correlation values associated with the respective subframes. The method further includes re-classifying the digital signal as a VOICED signal when each of the pitch differences is below a first threshold and the averaged normalized pitch correlation value exceeds a second threshold, and encoding the digital signal in accordance with a classification of the digital signal. The digital signal is encoded in the frequency-domain when the digital signal is classified as an AUDIO signal. The digital signal is encoded in the time-domain when the digital signal is classified as a VOICED signal.

BRIEF DESCRIPTION OF THE DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
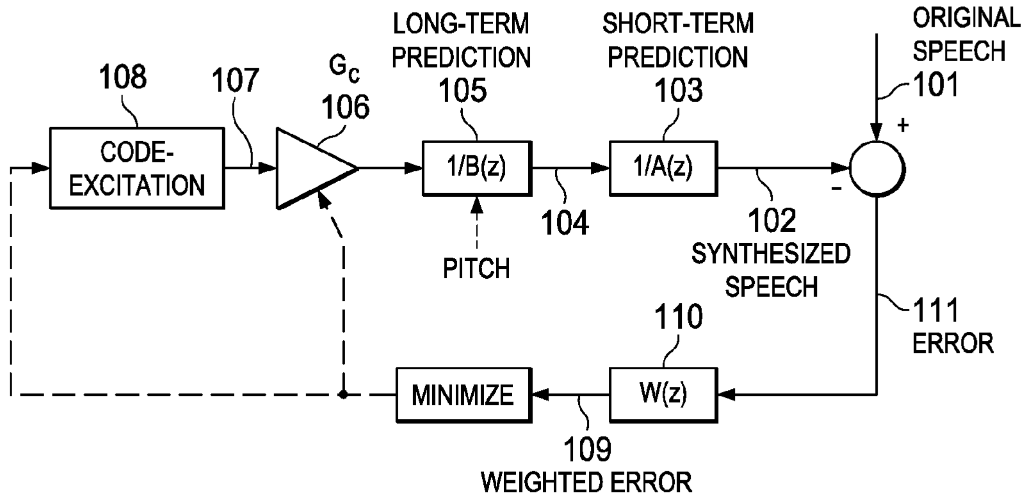
FIG. 1 illustrates a diagram of an embodiment code-excited linear prediction (CELP) encoder.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Audio signals are typically encoded in either the time-domain or the frequency domain. More specifically, audio signals carrying speech data are typically classified as VOICE signals and are encoded using time-domain encoding techniques, while audio signals carrying non-speech data are typically classified as AUDIO signals and are encoded using frequency-domain encoding techniques. Notably, the term "audio (lowercase) signal" is used herein to refer to any signal carrying sound data (speech data, non-speech data, etc.), while the term "AUDIO (uppercase) signal" is used herein to refer to a specific signal classification. This traditional manner of classifying audio signals typically generates higher quality encoded signals because speech data is generally periodic in nature, and therefore more amenable to time-domain encoding, while non-speech data is typically aperiodic in nature, and therefore more amenable to frequency-domain encoding. However, some non-speech signals exhibit enough periodicity to warrant time-domain encoding.

Aspects of this disclosure re-classify audio signals carrying non-speech data as VOICE signals when a periodicity parameter of the audio signal exceeds a threshold. In some embodiments, only low and/or medium bit-rate AUDIO signals are considered for re-classification. In other embodiments, all AUDIO signals are considered. The periodicity parameter can include any characteristic or set of characteristics indicative of periodicity. For example, the periodicity parameter may include pitch differences between subframes in the audio signal, a normalized pitch correlation for one or more subframes, an average normalized pitch correlation for the audio signal, or combinations thereof. Audio signals which are re-classified as VOICED signals may be encoded in the time-domain, while audio signals that remain classified as AUDIO signals may be encoded in the frequency-domain.

Generally speaking, it is better to use time domain coding for speech signal and frequency domain coding for music signal in order to achieve best quality. However, for some specific music signal such as very periodic signal, it may be better to use time domain coding by benefiting from very high Long-Term Prediction (LTP) gain. The classification of audio signals prior to encoding should therefore be performed carefully, and may benefit from the consideration of various supplemental factors, such as the bit rate of the signals and/or characteristics of the coding algorithms.

Speech data is typically characterized by a fast changing signal in which the spectrum and/or energy varies faster than other signal types (e.g., music, etc.). Speech signals can be classified as UNVOICED signals, VOICED signals, GENERIC signals, or TRANSITION signals depending on the characteristics of their audio data. Non-speech data (e.g., music, etc.) is typically defined as a slow changing signal, the spectrum and/or energy of which changes slower than speech signal. Normally, music signal may include tone and harmonic types of AUDIO signal. For high-bit rate coding, it may typically be advantageous to use frequency-domain coding algorithm to code non-speech signals. However, when low or medium bit rate coding algorithms are used, it may be advantageous to use time-domain coding to encode tone or harmonic types of non-speech signals that exhibit strong periodicity, as frequency domain coding may be unable to precisely encode the entire frequency band at a low or medium bit rate. In other words, encoding non-speech signals that exhibit strong periodicity in the frequency domain may result in some frequency sub-bands not being encoded or being roughly encoded. On the other hand, CELP type of time domain coding has LTP function which can benefit a lot from strong periodicity. The following description will give a detailed example.

Several parameters are defined first. For a pitch lag P, a normalized pitch correlation is often defined in mathematical form as $$R(P) = \frac{\sum_n s_w(n) \cdot s_w(n-P)}{\sqrt{\sum_n \|s_w(n)\|^2 \cdot \sum_n \|s_w(n-P)\|^2}}.$$

In this equation, $s_w(n)$ is a weighted speech signal, the numerator is a correlation, and the denominator is an energy normalization factor. Suppose Voicing notes an average normalized pitch correlation value of the four subframes in a current speech frame: Voicing=$[R_1(P_1)+R_2(P_2)+R_3(P_3)+R_4(P_4)]/4$. $R_1(P_1)$, $R_2(P_2)$, $R_3(P_3)$, and $R_4(P_4)$ are the four normalized pitch correlations calculated for each subframe of the current speech frame; $P_1$, $P_2$, $P_3$, and $P_4$ for each subframe are the best pitch candidates found in the pitch range from P=PIT_MIN to P=PIT_MAX The smoothed pitch correlation from a previous frame to the current frame can be found using the following expression: Voicing_sm⇐(3·Voicing_sm+Voicing)/4.

Pitch differences between subframes can be defined using the following expressions:

$$dpit1=|P_1-P_2|$$

$$dpit2=|P_2-P_3|$$

$$dpit3=|P_3-P_4|$$

Figure 8A:
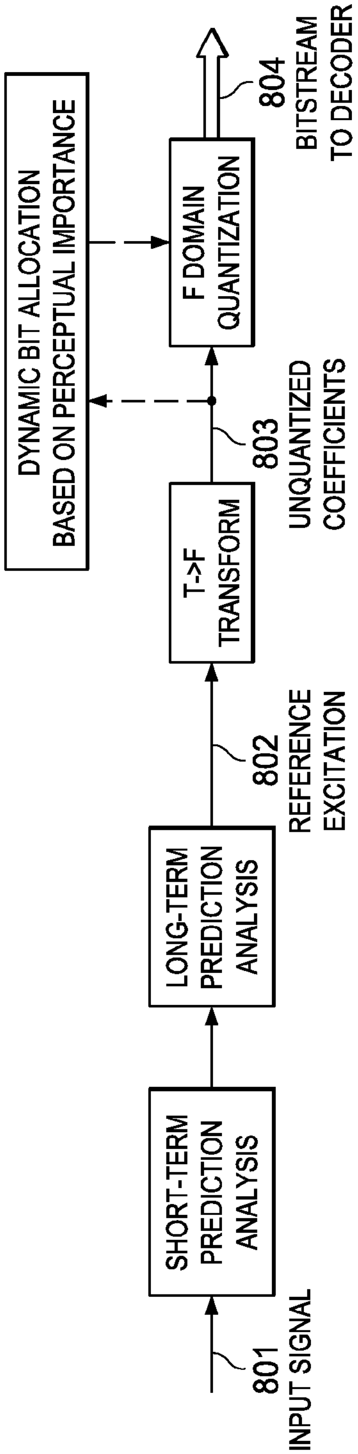
FIGS. 8A-8B illustrate diagrams of a low/medium bit-rate audio encoding system.
Figure 8B:
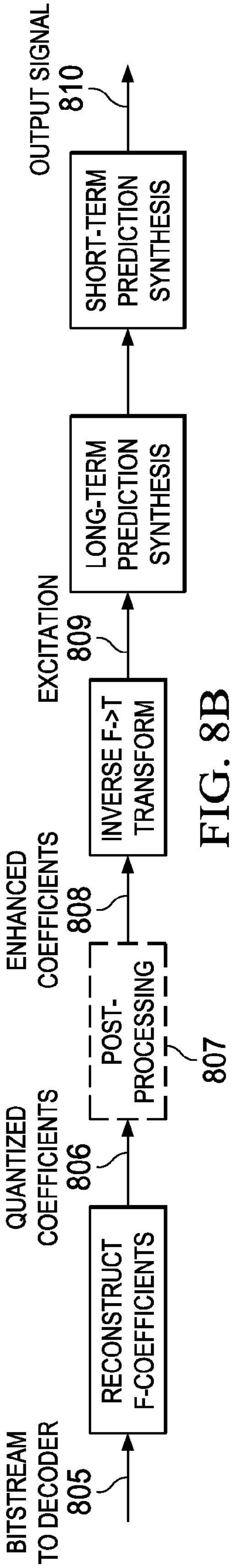

Suppose an audio signal is originally classified as an AUDIO signal and would be coded with frequency domain coding algorithm such as the algorithm shown in FIG. 8. In terms of the quality reason described above, the AUDIO class can be changed into VOICED class and then coded with time domain coding approach such as CELP. The following is a C-code example for re-classifying signals:

```
/* safe correction from AUDIO to VOICED for low bit rates*/
if   (coder_type== AUDIO & localVAD==1 & dpit1<=3.f &
dpit2<=3.f & dpit3<=3.f & Voicing>0.95f &    Voicing_sm>0.97)
{coder_type = VOICED;}
```

Accordingly, at low or medium bit rates, the perceptual quality of some AUDIO signal or music signals can be improved by re-classifying them as VOICED signals prior to encoding. The following is a C-code example for re-classifying signals:

ANNEXE C-CODE

```
/* safe correction from AUDIO to VOICED for low bit rates*/
 voicing=(voicing_fr[0]+voicing_fr[1]+voicing_fr[2]+voicing_fr[3])/4;
*voicing_sm = 0.75f*(*voicing_sm) + 0.25f*voicing;
dpit1 = (float)fabs(T_op_fr[0]-T_op_fr[1]);
dpit2 = (float)fabs(T_op_fr[1]-T_op_fr[2]);
dpit3 = (float)fabs(T_op_fr[2]-T_op_fr[3]);
if( *coder_type>UNVOICED && localVAD==1 && dpit1<=3.f &&
dpit2<=3.f && dpit3<=3.f && *coder_type==AUDIO && voicing>0.95f
&& *voicing_sm>0.97)
{
   *coder_type = VOICED;
```

Audio signals can be encoded in the time-domain or the frequency domain. Traditional time domain parametric audio coding techniques make use of redundancy inherent in the speech/audio signal to reduce the amount of encoded information as well as to estimate the parameters of speech samples of a signal at short intervals. This redundancy primarily arises from the repetition of speech wave shapes at a quasi-periodic rate, and the slow changing spectral envelop of speech signal. The redundancy of speech wave forms may be considered with respect to several different types of speech signal, such as voiced and unvoiced. For voiced speech, the speech signal is essentially periodic; however, this periodicity may be variable over the duration of a speech segment and the shape of the periodic wave usually changes gradually from segment to segment. A time domain speech coding could greatly benefit from exploring such periodicity. The voiced speech period is also called pitch, and pitch prediction is often named Long-Term Prediction (LTP). As for unvoiced speech, the signal is more like a random noise and has a smaller amount of predictability. Voiced and unvoiced speech are defined as follows.

In either case, parametric coding may be used to reduce the redundancy of the speech segments by separating the excitation component of speech signal from the spectral envelop component. The slowly changing spectral envelope can be represented by Linear Prediction Coding (LPC) also called Short-Term Prediction (STP). A time domain speech coding could also benefit a lot from exploring such a Short-Term Prediction. The coding advantage arises from the slow rate at which the parameters change. Yet, it is rare for the parameters to be significantly different from the values held within a few milliseconds. Accordingly, at the sampling rate of 8 kHz, 12.8 kHz or 16 kHz, the speech coding algorithm is such that the nominal frame duration is in the range of ten to thirty milliseconds. A frame duration of twenty milliseconds seems to be the most common choice. In more recent well-known standards such as G.723.1, G.729, G.718, EFR, SMV, AMR, VMR-WB or AMR-WB, the Code Excited Linear Prediction Technique ("CELP") has been adopted; CELP is commonly understood as a technical combination of Coded Excitation, Long-Term Prediction and Short-Term Prediction. Code-Excited Linear Prediction (CELP) Speech Coding is a very popular algorithm principle in speech compression area although the details of CELP for different codec could be significantly different.

FIG. 1 illustrates an initial code-excited linear prediction (CELP) encoder where a weighted error 109 between a synthesized speech 102 and an original speech 101 is minimized often by using a so-called analysis-by-synthesis approach. W(z) is an error weighting filter 110. 1/B(z) is a long-term linear prediction filter 105; 1/A(z) is a short-term linear prediction filter 103. The coded excitation 108, which is also called fixed codebook excitation, is scaled by a gain $G_c$ 107 before going through the linear filters. The short-term linear filter 103 is obtained by analyzing the original signal 101, which can be represented by the following set of coefficients:

$$A(z)=\sum_{i=1}^{P} 1+a_i\cdot z^{-i},\ i=1,2,\ \dots\ ,P.$$

The weighting filter 110 is somewhat related to the above short-term prediction filter. An embodiment weighting filter is represented by the following equation:

$$W(z)=\frac{A(z/\alpha)}{1-\beta\cdot z^{-1}},$$

where $\beta<\alpha$, $0<\beta<1$, $0<\alpha\leq 1$. The long-term prediction 105 depends on pitch and pitch gain. A pitch can be estimated from the original signal, a residual signal, or a weighted original signal. The long-term prediction function in principal can be expressed as follows: $B(z)=1-g_p\cdot z^{-Pitch}$.

The coded excitation 108 normally comprises a pulse-like signal or a noise-like signal, which can be mathematically constructed or saved in a codebook. Finally, the coded excitation index, quantized gain index, quantized long-term prediction parameter index, and quantized short-term prediction parameter index are transmitted to the decoder.

Figure 2:
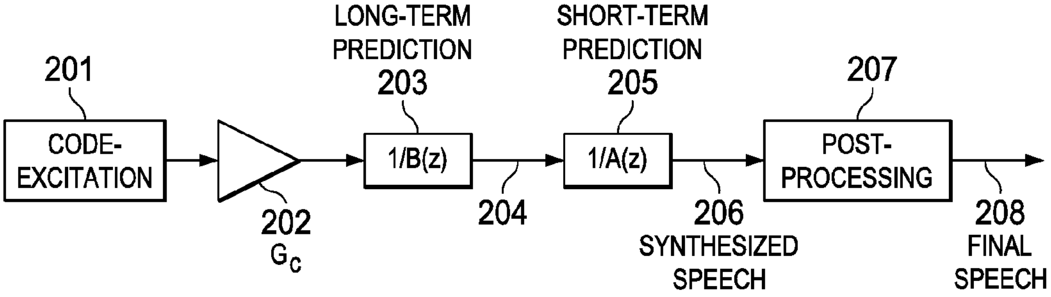
FIG. 2 illustrates a diagram of an embodiment initial decoder.

FIG. 2 illustrates an initial decoder, which adds a post-processing block 207 after a synthesized speech 206. The decoder is a combination of several blocks including a coded excitation 201, a long-term prediction 203, a short-term prediction 205, and a post-processing 207. The blocks 201, 203, and 205 are configured similarly to corresponding blocks 101, 103, and 105 of the encoder of FIG. 1. The post-processing could further consist of short-term post-processing and long-term post-processing.

Figure 3:
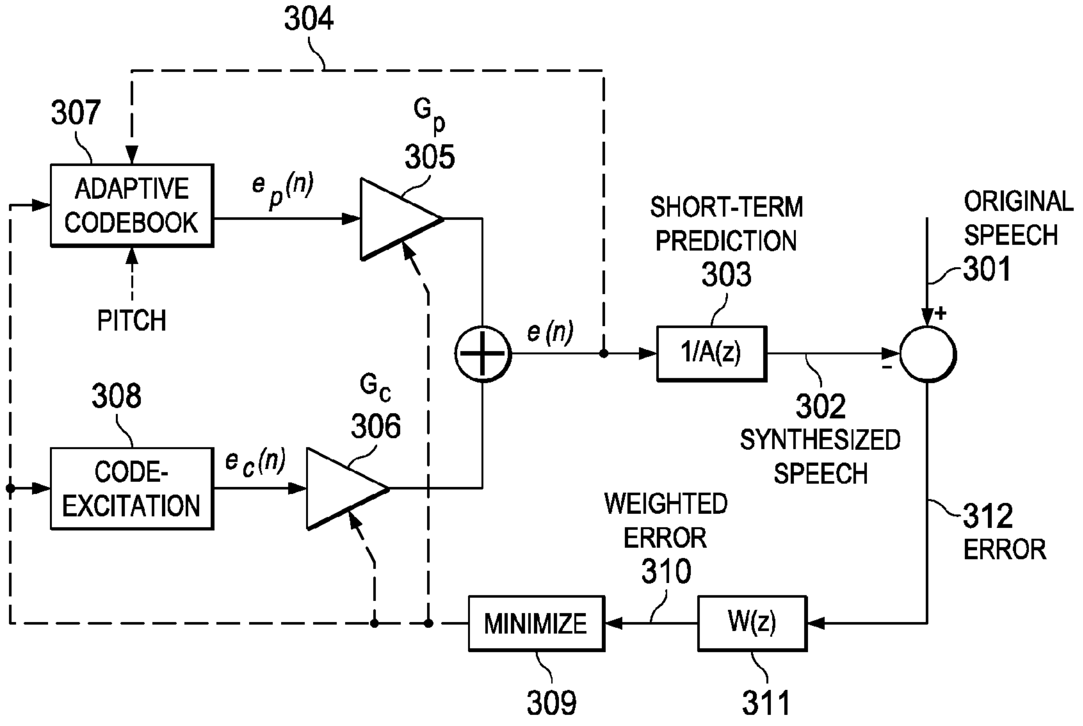
FIG. 3 illustrates a diagram of an embodiment encoder.

FIG. 3 shows a basic CELP encoder which realized the long-term linear prediction by using an adaptive codebook 307 containing a past synthesized excitation 304 or repeating past excitation pitch cycle at pitch period. Pitch lag can be encoded in integer value when it is large or long; pitch lag is often encoded in more precise fractional value when it is small or short. The periodic information of pitch is employed to generate the adaptive component of the excitation. This excitation component is then scaled by a gain $G_p$ 305 (also called pitch gain). The two scaled excitation components are added together before going through the short-term linear prediction filter 303. The two gains ($G_p$ and $G_c$) need to be quantized and then sent to a decoder.

Figure 4:
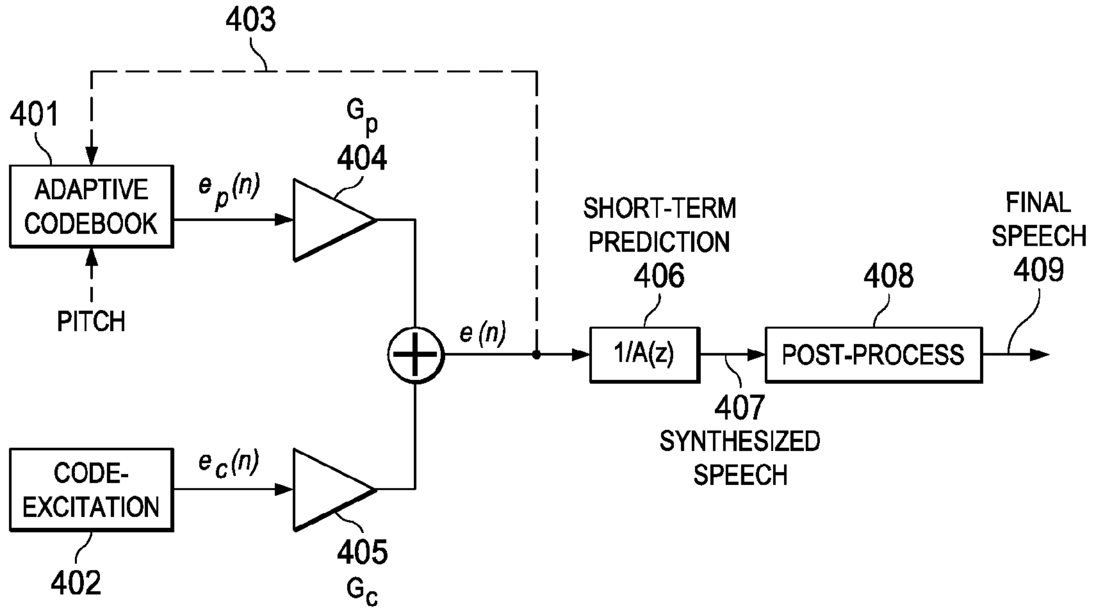
FIG. 4 illustrates a diagram of an embodiment decoder.

FIG. 4 shows a basic decoder corresponding to the encoder in FIG. 3, which adds a post-processing block 408 after a synthesized speech 407. This decoder is similar to that shown in FIG. 2, except for its inclusion of the adaptive codebook 307. The decoder is a combination of several blocks which are coded excitation 402, adaptive codebook 401, short-term prediction 406 and post-processing 408. Every block except post-processing has the same definition as described in the encoder of FIG. 3. The post-processing may further consist of short-term post-processing and long-term post-processing.

Long-Term Prediction can play an important role for voiced speech coding because voiced speech has strong periodicity. The adjacent pitch cycles of voiced speech are similar each other, which means mathematically the pitch gain $G_p$ in the following excitation express is high or close to 1 when expressed as follows: $e(n)=G_p\cdot e_p(n)+G_c\cdot e_c(n)$, where $e_p(n)$ is one subframe of sample series indexed by n, coming from the adaptive codebook 307 which comprises the past excitation 304; $e_p(n)$ may be adaptively low-pass filtered as low frequency area is often more periodic or more harmonic than high frequency area. $e_c(n)$ is from the coded excitation codebook 308 (also called fixed codebook) which is a current excitation contribution; $e_c(n)$ may also be enhanced such as high pass filtering enhancement, pitch enhancement, dispersion enhancement, formant enhancement, etc. For voiced speech, the contribution of $e_p(n)$ from the adaptive codebook could be dominant and the pitch gain $G_p$ 305 is around a value of 1. The excitation is usually updated for each subframe. Typical frame size is 20 milliseconds (ms) and typical subframe size is 5 milliseconds.

Figure 5:
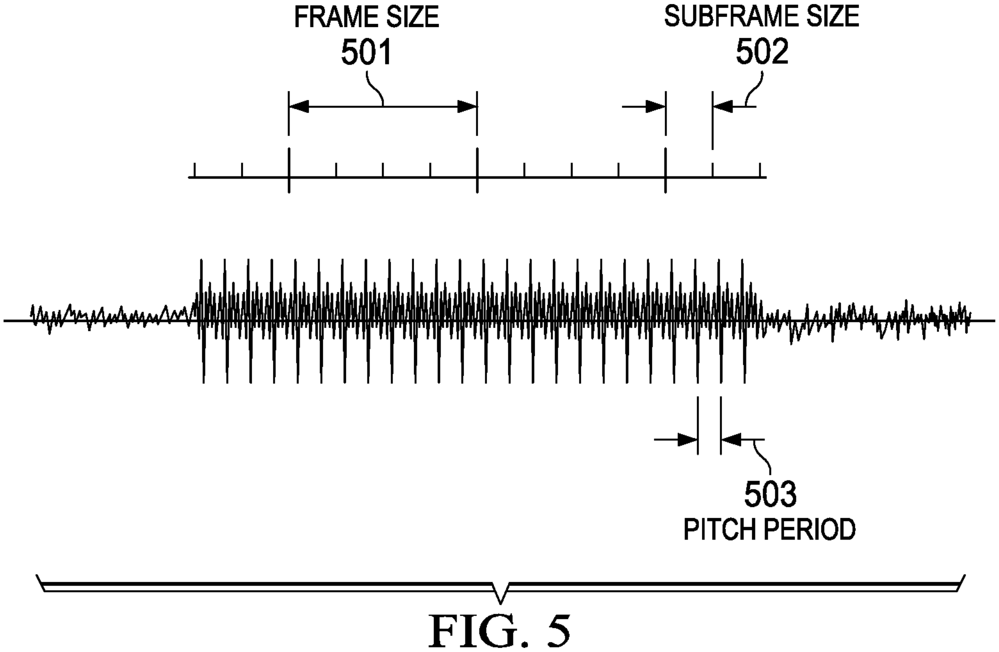
FIG. 5 illustrates a graph depicting a pitch period of a digital signal.
Figure 6:
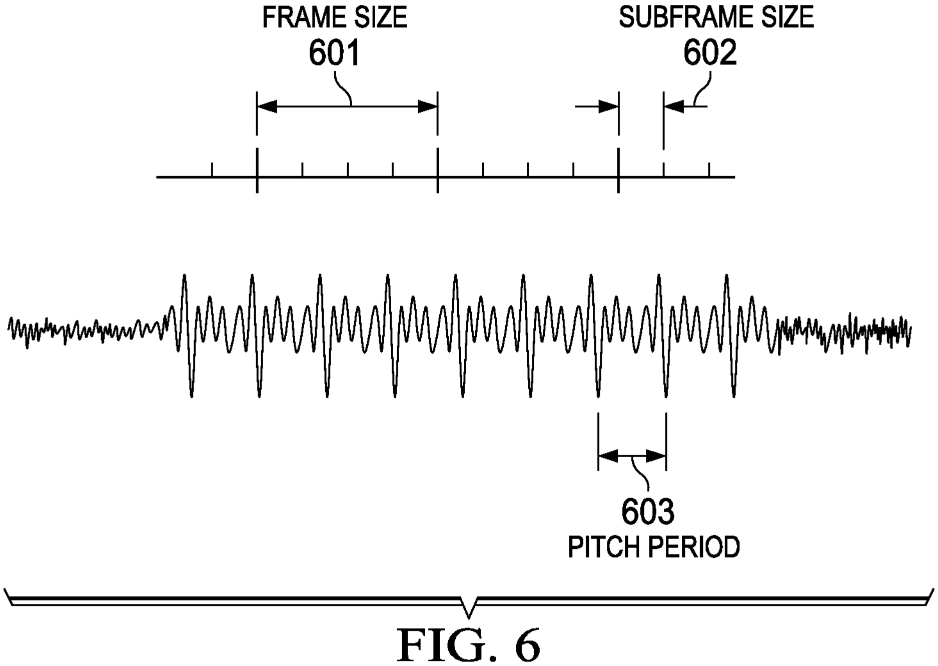
FIG. 6 illustrates a graph depicting a pitch period of another digital signal.

For voiced speech, one frame typically contains more than 2 pitch cycles. FIG. 5 shows an example that the pitch period 503 is smaller than the subframe size 502. FIG. 6 shows an example in which the pitch period 603 is larger than the subframe size 602 and smaller than the half frame size. As mentioned above, CELP is often used to encode speech signal by benefiting from specific human voice characteristics or human vocal voice production model. CELP algorithm is a very popular technology which has been used in various ITU-T, MPEG, 3GPP, and 3GPP2 standards. In order to encode speech signal more efficiently, speech signal may be classified into different classes and each class is encoded in a different way. For example, in some standards such as G.718, VMR-WB or AMR-WB, speech signal is classified into UNVOICED, TRANSITION, GENERIC, VOICED, and NOISE. For each class, LPC or STP filter may be used to represent spectral envelope; but the excitation to the LPC filter may be different. UNVOICED and NOISE may be coded with a noise excitation and some excitation enhancement. TRANSITION may be coded with a pulse excitation and some excitation enhancement without using adaptive codebook or LTP. GENERIC may be coded with a traditional CELP approach such as Algebraic CELP used in G.729 or AMR-WB, in which one 20 ms frame contains four 5 ms subframes, both the adaptive codebook excitation component and the fixed codebook excitation component are produced with some excitation enhancement for each subframe, pitch lags for the adaptive codebook in the first and third subframes are coded in a full range from a minimum pitch limit PIT_MIN to a maximum pitch limit PIT_MAX, and pitch lags for the adaptive codebook in the second and fourth subframes are coded differentially from the previous coded pitch lag.

VOICED may be coded in such way slightly different from GNERIC, in which pitch lag in the first subframe is coded in a full range from a minimum pitch limit PIT_MIN to a maximum pitch limit PIT_MAX, and pitch lags in the other subframes are coded differentially from the previous coded pitch lag; supposing the excitation sampling rate is 12.8 kHz, the example PIT_MIN value can be 34 or shorter; and PIT_MAX can be 231.

In modern audio/speech digital signal communication system, a digital signal is compressed at an encoder, and the compressed information or bit-stream can be packetized and sent to a decoder frame by frame through a communication channel. The combined encoder and decoder is often referred to as a codec. Speech/audio compression may be used to reduce the number of bits that represent speech/audio signal thereby reducing the bandwidth and/or bit rate needed for transmission. In general, a higher bit rate will result in higher audio quality, while a lower bit rate will result in lower audio quality.

Audio coding based on filter bank technology is widely used. In signal processing, a filter bank is an array of band-pass filters that separates the input signal into multiple components, each one carrying a single frequency sub-band of the original input signal. The process of decomposition performed by the filter bank is called analysis, and the output of filter bank analysis is referred to as a sub-band signal having as many sub-bands as there are filters in the filter bank. The reconstruction process is called filter bank synthesis. In digital signal processing, the term filter bank is also commonly applied to a bank of receivers, which also may down-convert the sub-bands to a low center frequency that can be re-sampled at a reduced rate. The same synthesized result can sometimes be also achieved by under-sampling the band-pass sub-bands. The output of filter bank analysis may be in a form of complex coefficients; each complex coefficient having a real element and imaginary element respectively representing a cosine term and a sine term for each sub-band of filter bank.

Filter-Bank Analysis and Filter-Bank Synthesis is one kind of transformation pair that transforms a time domain signal into frequency domain coefficients and inverse-transforms frequency domain coefficients back into a time domain signal. Other popular analysis techniques may be used in speech/audio signal coding, including synthesis pairs based on Cosine/Sine transformation, such as Fast Fourier Transform (FFT) and inverse FFT, Discrete Fourier Transform (DFT) and inverse DFT), Discrete cosine Transform (DCT) and inverse DCT), as well as modified DCT (MDCT) and inverse MDCT.

In the application of filter banks for signal compression or frequency domain audio compression, some frequencies are perceptually more important than others. After decomposition, perceptually significant frequencies can be coded with a fine resolution, as small differences at these frequencies are perceptually noticeable to warrant using a coding scheme that preserves these differences. On the other hand, less perceptually significant frequencies are not replicated as precisely, therefore, a coarser coding scheme can be used, even though some of the finer details will be lost in the coding. A typical coarser coding scheme may be based on the concept of Bandwidth Extension (BWE), also known as High Band Extension (HBE). One recently popular specific BWE or HBE approach is known as Sub Band Replica (SBR) or Spectral Band Replication (SBR). These techniques are similar in that they encode and decode some frequency sub-bands (usually high bands) with little or no bit rate budget, thereby yielding a significantly lower bit rate than a normal encoding/decoding approach. With the SBR technology, a spectral fine structure in high frequency band is copied from low frequency band, and random noise may be added. Next, a spectral envelope of the high frequency band is shaped by using side information transmitted from the encoder to the decoder.

Figure 7A:
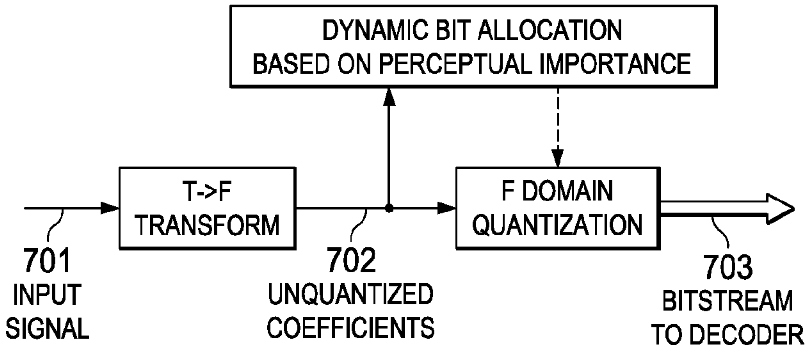
FIGS. 7A-7B illustrate diagrams of a frequency-domain perceptual codec.
Figure 7B:
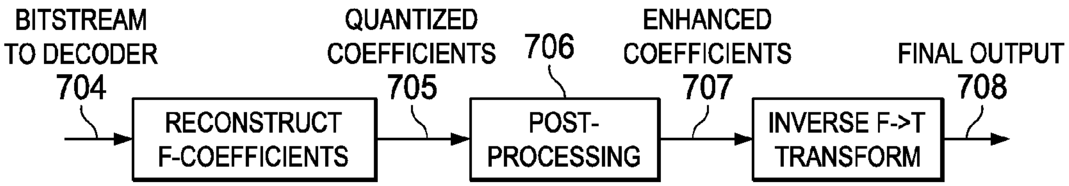

Use of psychoacoustic principle or perceptual masking effect for the design of audio compression makes sense. Audio/speech equipment or communication is intended for interaction with humans, with all their abilities and limitations of perception. Traditional audio equipment attempts to reproduce signals with the utmost fidelity to the original. A more appropriately directed and often more efficient goal is to achieve the fidelity perceivable by humans. This is the goal of perceptual coders. Although one main goal of digital audio perceptual coders is data reduction, perceptual coding can be used to improve the representation of digital audio through advanced bit allocation. One of the examples of perceptual coders could be multiband systems, dividing up the spectrum in a fashion that mimics the critical bands of psychoacoustics (Ballman 1991). By modeling human perception, perceptual coders can process signals much the way humans do, and take advantage of phenomena such as masking. While this is their goal, the process relies upon an accurate algorithm. Due to the fact that it is difficult to have a very accurate perceptual model which covers common human hearing behavior, the accuracy of any mathematical expression of perceptual model is still limited. However, with limited accuracy, the perception concept has helped a lot the design of audio codecs. Numerous MPEG audio coding schemes have benefitted from exploring perceptual masking effect. Several ITU standard codecs also use the perceptual concept; for example, ITU G.729.1 performs so-called dynamic bit allocation based on perceptual masking concept; the dynamic bit allocation concept based on perceptual importance is also used in recent 3GPP EVS codec. FIGS. 7A-7B give a brief description of typical frequency domain perceptual codec. The input signal 701 is first transformed into frequency domain to get unquantized frequency domain coefficients 702. Before quantizing the coefficients, the masking function (perceptual importance) divides the frequency spectrum into many sub-bands (often equally spaced for the simplicity). Each sub-band dynamically allocates the needed number of bits while maintaining the total number of bits distributed to all sub-bands is not beyond the up-limit. Some sub-band even allocates 0 bit if it is judged to be under the masking threshold. Once a determination is made as to what can be discarded, the remainder is allocated the available number of bits. Because bits are not wasted on masked spectrum, they can be distributed in greater quantity to the rest of the signal. According to allocated bits, the coefficients are quantized and the bit-stream 703 is sent to decoder. Although the perceptual masking concept helped a lot during codec design, it is still not perfect due to various reasons and limitations; the decoder side post-processing (see FIG. 7 (*b*)) can further improve the perceptual quality of decoded signal produced with limited bit rates. The decoder first uses the received bits 704 to reconstruct the quantized coefficients 705; then they are post-processed by a properly designed module 706 to get the enhanced coefficients 707; an inverse-transformation is performed on the enhanced coefficients to have the final time domain output 708.

For low or medium bit rate audio coding, short-term linear prediction (STP) and long-term linear prediction (LTP) can be combined with a frequency domain excitation coding. FIG. 8 gives a brief description of a low or medium bit rate audio coding system. The original signal 801 is analyzed by short-term prediction and long-term prediction to obtain a quantized STP filter and LTP filter; the quantized parameters of the STP filter and LTP filter are transmitted from an encoder to a decoder; at the encoder, the signal 801 is filtered by the inverse STP filter and LTP filter to obtain a reference excitation signal 802. A frequency domain coding is performed on the reference excitation signal which is transformed into frequency domain to get unquantized frequency domain coefficients 803. Before quantizing the coefficients, frequency spectrum is often divided into many sub-bands and a masking function (perceptual importance) is explored. Each sub-band dynamically allocates a needed number of bits while maintaining that a total number of bits distributed to all sub-bands is not beyond an up-limit. Some sub-band even allocates 0 bit if it is judged to be under a masking threshold. Once a determination is made as to what can be discarded, the remainder is allocated available number of bits. According to allocated bits, the coefficients are quantized and the bit-stream 803 is sent to the decoder. The decoder uses the received bits 805 to reconstruct the quantized coefficients 806; then they are possibly post-processed by a properly designed module 807 to get the enhanced coefficients 808; an inverse-transformation is performed on the enhanced coefficients to have the time domain excitation 809. The final output signal 810 is obtained by filtering the time domain excitation 809 with a LTP synthesis filter and a STP synthesis filter.

Figure 9:
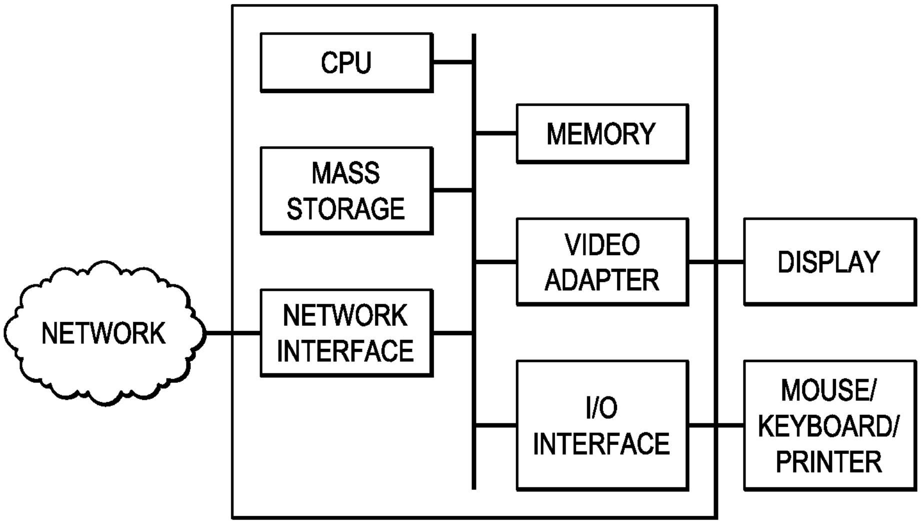
FIG. 9 illustrates a block diagram of an embodiment processing system.

FIG. 9 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

Figure 10:
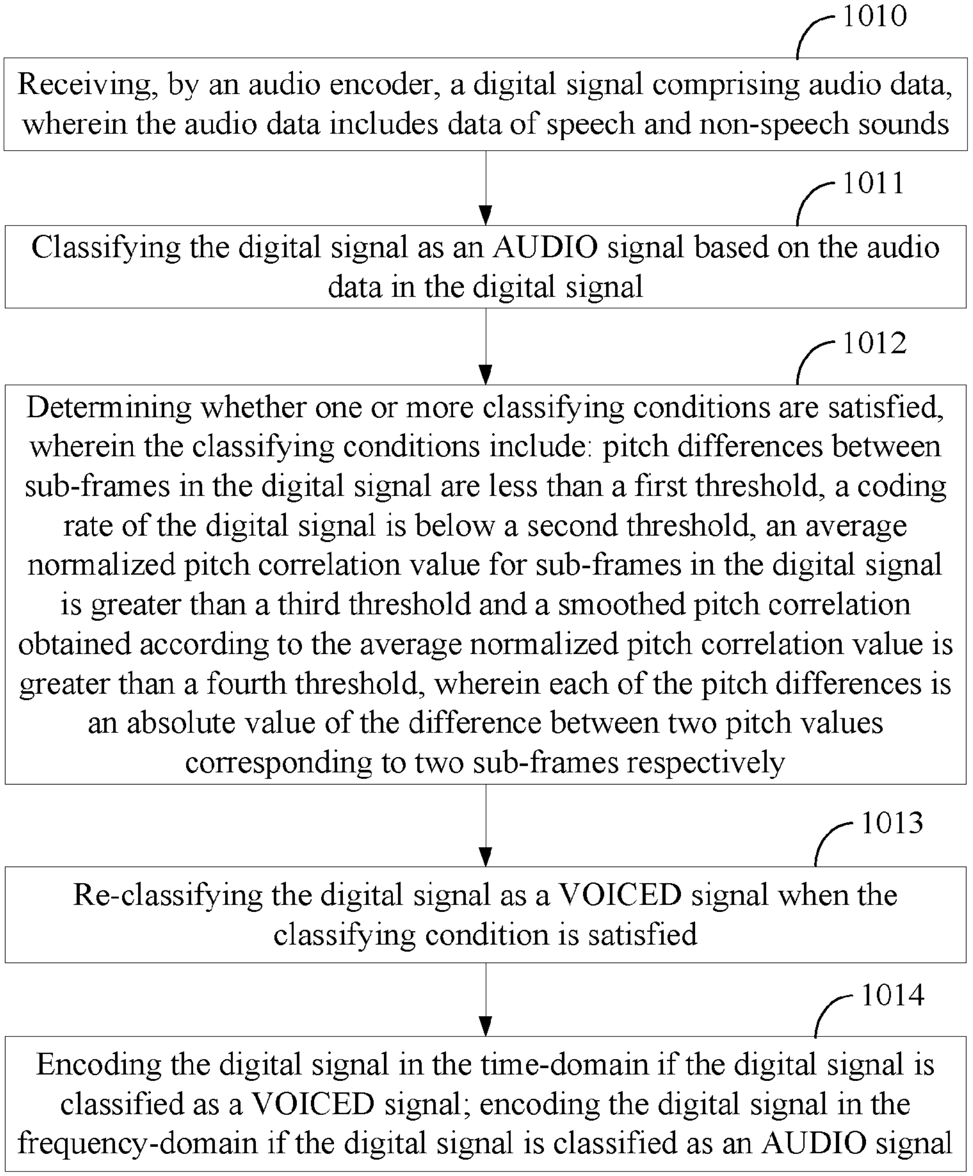
FIG. 10 illustrates a flowchart of an embodiment method for encoding signals.

FIG. 10 illustrates an embodiment method 1000 for encoding signals. At step 1010, an audio encoder receives a digital signal comprising audio data. The audio data includes data of speech and non-speech sounds. At step 1011, the digital signal is classified as an AUDIO signal based on the audio data in the digital signal. At step 1012, it is determined whether one or more classifying conditions are satisfied. The classifying conditions include pitch differences between sub-frames in the digital signal are less than a first threshold, a coding rate of the digital signal is below a second threshold, and an average normalized pitch correlation value for sub-frames in the digital signal is greater than a third threshold and a smoothed pitch correlation obtained according to the average normalized pitch correlation value is greater than a fourth threshold. Each of the pitch differences is an absolute value of the difference between two pitch values corresponding to two sub-frames, respectively. At step 1013, the digital signal is reclassified as a VOICED signal when the classifying condition is satisfied. At step 1014, the digital signal is in the time-domain if the digital signal is classified as a VOICED signal, or encoded in the frequency-domain if the digital signal is classified as an AUDIO signal.

What is claimed:

1. A method for encoding signals, the method comprising:

receiving, by an audio encoder, a digital signal comprising audio data, wherein the audio data includes data of speech and non-speech sounds;

classifying, by the audio encoder, the digital signal as an AUDIO signal based on the audio data in the digital signal;

determining, by the audio encoder, whether classifying conditions are satisfied, wherein the classifying conditions include: pitch differences between sub-frames in the digital signal are less than a first threshold, a coding rate of the digital signal is below a second threshold, an average normalized pitch correlation value for the sub-frames in the digital signal is greater than a third threshold and a smoothed pitch correlation obtained according to the average normalized pitch correlation value is greater than a fourth threshold, wherein each of the pitch differences is an absolute value of the difference between two pitch values corresponding to two sub-frames respectively;

re-classifying, by the audio encoder, the digital signal as a VOICED signal when the classifying conditions are satisfied;

encoding, by the audio encoder, the digital signal in the time-domain if the digital signal is classified as a VOICED signal; and encoding, by the audio encoder, the digital signal in the frequency-domain if the digital signal is classified as an AUDIO signal.

2. The method of claim 1, wherein the average normalized pitch correlation value for the sub-frames in the digital signal is obtained by:

determining a normalized pitch correlation value for each sub-frame in the digital signal; and dividing the sum of all normalized pitch correlation values by the number of the sub-frames in the digital signal to obtain the average normalized pitch correlation value.

3. The method of claim 1, wherein the digital signal carries non-speech data.

4. The method of claim 1, wherein the digital signal carries music data.

5. The method of claim 1, wherein, the number of the sub-frames is 4, the pitch differences comprises the first pitch difference dpit1, the second pitch difference dpit2, and the third pitch difference dpit3, wherein, the dpit1, the dpit2 and the dpit3 are calculated as follows:

$$dpit1=|P_1-P_2|$$

$$dpit2=|P_2-P_3|,$$

$$dpit3=|P_3-P_4|$$

wherein, $P_1$, $P_2$, $P_3$, and $P_4$ are four pitch values corresponding to the sub-frames respectively;

accordingly, and wherein the classifying condition that the pitch differences between the sub-frames in the digital signal are less than a threshold comprises: all the dpit1, the dpit2 and the dpit 3 are less than the first threshold.

6. The method of claim 5, wherein, $P_1$, $P_2$, $P_3$, and $P_4$ are the best pitch values found in a pitch range from a minimum pitch limit PIT_MIN to a maximum pitch limit PIT_MAX for each sub-frame.

7. The method of claim 1, wherein, the smoothed pitch correlation from a previous to a current frame is obtained by following formula:

$$Voicing\_sm=(3\cdot Voicing\_sm+Voicing)/4$$

wherein, the Voicing_sm at the left side of the formula denotes the smoothed pitch correlation of the current frame, the Voicing_sm at the right side of the formula denotes the smoothed pitch correlation of the previous frame and Voicing denotes the average normalized pitch correlation value for the sub-frames in the digital signal.

8. An audio encoder comprising:

at least one processor; and a computer readable storage medium storing programming for execution by the at least one processor, the programming including instructions to:

receive a digital signal comprising audio data, wherein the audio data includes data of speech and non-speech sounds;

classify the digital signal as an AUDIO signal based on the audio data in the digital signal;

determine whether classifying conditions are satisfied, wherein, the classifying conditions include: pitch differences between sub-frames in the digital signal are less than a first threshold, a coding rate of the digital signal is below a second threshold, an average normalized pitch correlation value for the sub-frames in the digital signal is greater than a third threshold and a smoothed pitch correlation obtained according to the average normalized pitch correlation value is greater than a fourth threshold; wherein, each of the pitch differences is an absolute value of the difference between two pitch values corresponding to two sub-frames respectively;

re-classify the digital signal as a VOICED signal when the classifying conditions are satisfied;

encode the digital signal in the time-domain if the digital signal is classified as a VOICED signal; and encode the digital signal in the frequency-domain if the digital signal is classified as an AUDIO signal.

9. The audio encoder of claim 8, wherein the instructions to determine an average normalized pitch correlation value for the sub-frames in the digital signal include instructions to:

determine a normalized pitch correlation value for each sub-frame in the digital signal; and divide the sum of all normalized pitch correlation values by the number of the sub-frames in the digital signal to obtain the average normalized pitch correlation value.

10. The audio encoder of claim 8, wherein the digital signal carries non-speech data.

11. The audio encoder of claim 8, wherein the digital signal carries music data.

12. The audio encoder of claim 8, wherein, the number of the sub-frames is 4, the pitch differences comprises the first pitch difference dpit1, the second pitch difference dpit2, the third pitch difference dpit3, wherein, the dpit1, the dpit2 and the dpit3 are calculated as follows:

$$dpit1=|P_1-P_2|$$

$$dpit2=|P_2-P_3|,$$

$$dpit3=|P_3-P_4|$$

wherein, $P_1$, $P_2$, $P_3$, and $P_4$ are four pitch values corresponding to the sub-frames respectively;

accordingly, and wherein the classifying condition that the pitch differences between sub-frames in the digital signal are less than a threshold comprises: all the dpit1, the dpit2 and the dpit 3 are less than the first threshold.

13. The audio encoder of claim 12, wherein, $P_1$, $P_2$, $P_3$, and $P_4$ are the best pitch values found in a pitch range from a minimum pitch limit PIT_MIN to a maximum pitch limit PIT_MAX for each sub-frame.

14. The audio encoder of claim 8, wherein, the smoothed pitch correlation from a previous to a current frame is obtained by following formula:

$$Voicing\_sm=(3\cdot Voicing\_sm+Voicing)/4$$

wherein, the Voicing_sm at the left side of the formula denotes the smoothed pitch correlation of the current frame, the Voicing_sm at the right side of the formula denotes the smoothed pitch correlation of the previous frame and Voicing denotes the average normalized pitch correlation value for the sub-frames in the digital signal.

* * * * *